United States Patent [19]

Kakugo et al.

[11] Patent Number: 4,748,207

[45] Date of Patent: * May 31, 1988

[54] POLYPROPYLENE SHEET

[75] Inventors: Masahiro Kakugo; Yoshiharu Fukui; Kizuku Wakatsuki; Hideaki Nishio, all of Chiba, Japan

[73] Assignee: Sumitomo Chemical Company, Limited, Osaka, Japan

[*] Notice: The portion of the term of this patent subsequent to Nov. 5, 2002 has been disclaimed.

[21] Appl. No.: 753,082

[22] Filed: Jul. 9, 1985

[30] Foreign Application Priority Data

Jul. 9, 1984 [JP] Japan .................................. 59-141870

[51] Int. Cl.$^4$ ...................... C08L 23/12; C08L 23/14; C08L 53/00; C08J 5/18
[52] U.S. Cl. ........................................ 525/88; 525/89; 525/95; 525/216; 525/297
[58] Field of Search ...................... 525/240, 88, 89, 95, 525/216, 297

[56] References Cited

U.S. PATENT DOCUMENTS 3,347,838  10/1967  Clark ................................. 526/348.4
3,755,500   8/1973  Clark ................................. 525/297

FOREIGN PATENT DOCUMENTS 1030797  5/1966  United Kingdom .
1104665  2/1968  United Kingdom .

*Primary Examiner*—Carman J. Seccuro
*Attorney, Agent, or Firm*—Sughrue, Mion, Zinn, Macpeak, and Seas

[57] ABSTRACT

A crystalline polypropylene sheet is described, characterized by containing a polymer of a vinylcycloalkane having at least 6 carbon atoms in an amount of 0.05 wt ppm to 1 wt % (calculated as a vinylcycloalkane unit). This sheet is excellent in stiffness and transparency and is suitable for use in the production of various articles such as containers and trays.

4 Claims, No Drawings

POLYPROPYLENE SHEET

FIELD OF THE INVENTION

The present invention relates to a polypropylene sheet excellent in stiffness and transparency.

BACKGROUND OF THE INVENTION

A polypropylene sheet has been finding an increased number of uses in various fields because of its low production costs as well as excellent mechanical and optical properties, secondary moldability and moisture proofness. In some applications, however, these properties are not sufficiently satisfactory. For example, in fields where the polypropylene sheet competes with those of, for example, polystyrene and polyvinyl chloride, it is required to be improved in stiffness and transparency.

Several attempts have been made to improve the siffness and transparency of polypropylene. It is known that if aluminum or sodium salts of aromatic carboxylic acids (Japanese Patent Application (OPI) No. 80329/83), or aromatic carboxylic acids, aromatic phosphoric acid metal salts, and sorbitol derivatives (Japanese Patent Publication No. 12460/80 and Japanese Patent Application (OPI) No. 129036/83) are added, they act as agents to form crystal nuclei (hereinafter referred to as "nucleating agents"), thereby improving the stiffness and transparency. The term "OPI" as used herein means a "published unexamined Japanese patent application".

Of the above nucleating agents, the sorbitol derivatives are excellent in the nucleating effect. These sorbitol derivatives, however, have disadvantages in that they readily bleed out of the polypropylene after molding, thereby causing whitening of the molded polypropylene, and they generate unpleasant odor during the molding. Thus the sorbitol derivatives are limited in their application. Further, the aluminum salts of aromatic carboxylic acids are widely used as the nucleating agent. However, polypropylene sheets containing the aluminum salts, when allowed to stand for long periods of time, may absorb moisture and cause turbidity.

Japanese Patent Publication No. 32430/70 discloses that copolymerization of a random copolymer of propylene and an α-olefin having 4 to 8 carbon atoms with 3-methylbutene-1 improves transparency. In this case, however, the effect of improving the transparency is not sufficiently high.

SUMMARY OF THE INVENTION

As a result of extensive investigations to overcome the above problems, it has been found that if polymers of vinylcycloalkane having at least 6 carbon atoms are added to polypropylene, the stiffness and transparency of polypropylene sheets can be improved without causing problems such as whitening, turbidity, and odor.

The present invention relates to a crystalline polypropylene sheet containing a polymer of a vinylcycloalkane in an amount of 0.05 wt ppm to 1 wt% (calculated as a vinylcycloalkane unit).

DETAILED DESCRIPTION OF THE INVENTION

The crystalline polypropylene sheet of the present invention is excellent in stiffness and transparency. The term "sheet" as used herein means a sheet having a thickness of about 0.1 to 3 mm as obtained by usual extrusion molding.

The amount of the polymer of the vinylcycloalkane added is not critical. However, in order to minimize changes in the inherent physical properties of polypropylene, it is preferred that the amount of the polymer of the vinylcycloalkane added be decreased as much as possible within the range that the nucleating effect can be obtained. Thus the content of the polymer of the vinylcycloalkane (calculated as a vinylcycloalkane unit) is preferably 0.05 wt ppm to 1 wt% and more preferably 0.5 to 5,000 wt ppm.

Vinylcycloalkanes having at least 6 carbon atoms which can be used in the present invention include vinylcyclobutane, vinylcyclopentane, vinyl-3-methylcyclopentane, vinylcyclohexane, vinyl-b 2-methylcyclohexane, vinyl-3-methylcyclohexane, and vinylnorbornane. Of these compounds, vinylcycloalkanes having 8 or more carbon atoms are preferred.

A crystalline polypropylene composition containing the above vinylcycloalkane polymer can be prepared as follows.

(1) A vinylcycloalkane having at least 6 carbon atoms is polymerized in the presence of a Tiegler-Natta catalyst, and subsequently propylene is homopolymerized or copolyerized with other α-olefin.

(2) The polymer as obtained in (1) is mixed with a propylene homopolymer or a propylene/α-olefin copolymer.

(3) A polymer of a vinylcycloalkane having at least 6 carbon atoms is mixed with a propylene homopolymer or a propylene/α-olefin copolymer.

The crystalline polypropylene composition used in the present invention may be blended with known polymers such as ethylene/propylene rubber (EP rubber), fillers such as mica and talc, and so forth. This mixing can be carried out by known techniques such as using a Brabender, a roll, or an extruder. If desired, additives commonly compounded to polypropylene, such as a degradation-preventing agent, a lubricant, an antistatic agent, and an antiblocking agent, can be added to the polypropylene composition.

In the polymerization of the vinylcycloalkane having at least 6 carbon atoms, the known Ziegler-Natta catalyst producing an isotactic polymer is used. In the present invention, titanium trichloride catalysts sold by Toyo Stauffer Co., Ltd., Toho Titanium Co., Ltd., Marubeni Solvay Co., Ltd., and so forth are suitable to use. In addition, catalysts deposited on a magnesium compound as described in Japanese Patent Application (OPI) Nos. 59916/82 and 133408/80 are suitable to use.

The crystalline polypropylene composition containing 0.05 wt ppm to 1 wt% (calculated as a vinylcycloalkane unit) of the polymer of the vinylcycloalkane is molded into a sheet by the usual extrusion molding. The sheet thus produced is free from problems such as whitening, turbidity, and odor, and exhibits good stiffness and transparency.

The crystalline polypropylene sheet of the present invention can be molded and used in various forms. Typical examples are shown below.

Containers for soybean curd, short-necked clams, oysters, jelly, etc., which are produced by vacuum molding; meat trays, PTP, etc., which are produced by pressure molding; stationeries such as clear holders and book binders; and electric appliances such as VTR cassette tape cases, floppy disc holders, etc.

The present invention is described in greater detail with reference to the following examples, although it is not limited thereto.

The intrinsic viscosity [η], melt index, and haze were measured by the following methods.

(1) Intrinsic viscosity [η]

Measured in tetralin at 135° C. by the use of a Ubbelohde's viscometer.

(2) Melt index

Measured according to JIS K6758.

(3) Internal haze

Measured according to ASTM D1003 in the state that the influences of the surface of a sample had been removed by dipping the sample in dimethyl phthalate in a glass cell.

EXAMPLE 1

(A) Preparation of Organomagnesium Compound

Twelve grams of magnesium flakes for a Grignard reagent synthesis was placed in a 1-liter flask equipped with a stirrer, a reflux condenser, and a dropping funnel. After replacement of the atmosphere in the flask with argon, 250 ml of di-n-butyl ether was introduced in the flask, and 62 ml of n-butyl chloride (mole ratio of n-butyl chloride to magnesium: 1.2:1) was placed in the dropping funnel. The reaction was started by dropping the n-butyl chloride in the flask maintained at 50° C. The n-butyl chloride was dropped at 50° C. over 2 hours. Thereafter, the reaction was continued for an additional 2 hours to prepare a solution of n-butylmagnesium chloride in di-n-butyl ether. The concentration of the n-butylmagnesium chloride solution was 1.45 mole/l.

(B) Preparation of Magnesium Compound

A solution prepared by diluting 55 ml of silicon tetrachloride with 112 ml of toluene (mole ratio of magnesium to silicon: 1:1) was dropped to the n-butylmagnesium chloride solution as prepared in (A) above, maintained at 20° C. to start the reaction. The solution was dropped at 20° C. over 3 hours to form white precipitate.

Thereafter the reaction was carried out for 1 hour at the same temperature. After completion of the reaction, the reaction mixture was allowed to stand. The supernatant liquid thus formed was separated, and the residue was washed with n-heptane and vacuum dried to obtain 65 g of a solid product.

(C) Preparation of Solid Catalyst

After replacement of the atmosphere in a 200-ml flask equipped with a stirrer and a thermometer, 70 ml of monochlorobenzene as a solvent, 30 ml of titanium tetrachloride, and 12.85 g of phenol were placed in the flask, and then heated to 50° C. The reaction proceeded with evolution of hydrogen chloride gas. The reaction mixture was maintained at this temperature for 1 hour. After completion of the reaction, 1 ml of the reaction mixture was sampled. In the infrared absorption spectrum of the sample, an absorption ascribed to the stretch vibration of the OH group of phenol was not observed. Thus, a liquid titanium compound having an average composition $Ti(OC_6H_5)_{0.5}Cl_{3.5}$ was obtained.

To this reaction solution were added 1.5 ml of ethyl benzoate and then 5 g of the solid product was obtained in (B) above. The resulting mixture was heated to 120° C.

The catalytic reaction was conducted with stirring at 120° C. for 1 hour. The reaction mixture was allowed to stand, and the supernatant liquid was isolated at 120° C.

Then, 50 ml of n-heptane was added to the residue, and the resulting mixture was stirred at 90° C. for 5 minutes and then allowed to stand. The supernatant liquid was isolated. This procedure was repeated five times to achieve washing.

The residue was vacuum dried to obtain 3.4 g of a solid catalyst. The titanium atom content of the solid catalyst was 2.6 wt%.

(D) Polymerization of Vinylcyclohexane

In a flask the atmosphere of which had been replaced with argon gas were successively introduced 100 ml of dehydrated and purified n-heptane, 1.95 g of triethylaluminum, 675 mg of ethyl p-anisate, and 6.0 g of the solid catalyst (C). The resulting mixture was then heated to 50° C.

Subsequently, 50 ml of vinylcyclohexane was added thereto and polymerized for 15 minutes.

The polymer slurry thus formed was washed four times with 200 ml of n-heptane to remove unreacted vinylcyclohexane and as the cocatalysts triethylaluminum and ethyl p-anisate. The n-heptane was removed from the active slurry which had been washed with n-heptane, by distillation under reduced pressure to obtain 7.8 g of an active catalyst-containing polyvinylcyclohexane powder. The polyvinylcyclohexane content of this powder was 0.30 g per gram of the solid catalyst (C).

Using 1.06 g of the above polyvinylcyclohexane-containing polymerization catalyst, 0.75 g of triethylaluminum, 0.237 g of methyl p-toluate, and 1,500 ml of n-heptane, propylene was polymerized in a 5-liter stainless steel autoclave under the conditions of pressure of 6 $kg/cm^2G$, temperature of 70° C. and hydrogen concentration of 1.5 vol% for 40 minutes.

After the polymerization, 50 ml of n-butanol was added to stop the polymerization. The polymer slurry was taken out, and filtered to separate the polymer powder from the solvent. The polymer powder was washed with 500 ml of 1N hydrochloric acid and then with methanol until the washings became neutral. The powder was dried, and then it was weighed and found to be 840 g.

The amount of polymerized propylene was 1,030 g per gram of the solid catalyst. [η] was 1.93 dl/g.

To a mixture of 85% of a propylene homopolymer having a melt index of 2.0 and 15% of the copolymer prepared above were added 0.1 part by weight of calcium stearate and 0.2 part by weight of BHT (2,6-di-tert-butylhydroxytoluene) as stabilizers and 0.05 part by weight of Irganox 1010 ® (trade name; antioxidant produced by Ciba-Geigy AG; tetrakis[methylene-3-(3',5'-di-tert-butyl-4-hydroxyphenyl)propionate]methane), and they were then mixed in a Henschel mixer. The resulting mixture was pelletized by the use of a 40 mm φ extruder.

These pellets were melted and extruded at a resin temperature of 280° C. by the use of a 40 mm φ sheet extruder and cooled and solidified with a cooling roll maintained at 35° C. to produce a 0.5 mm-thick cooled sheet.

The sheet thus produced was soaked in water maintained at 23° C. for 15 days. Turbidity was not observed.

COMPARATIVE EXAMPLE 1

In this example, the polyvinylcyclohexane was not used. To a propylene homopolymer having a melt index of 2.0 were added 0.1 part by weight of calcium stearate, 0.2 part by weight of BHT, and 0.05 part by weight of Irganox 1010 ®. The resulting mixture was mixed, pelletized and molded into a sheet under the same conditions as in Example 1.

The physical properties of the sheets produced in Example 1 and Comparative Example 1 are shown in Table 1.

TABLE 1

| | Tensile | | Transparency | |
| | Young's Modulus | | Total Light | Internal |
| | MD* ($kg/cm^2$) | TD** ($kg/cm^2$) | Transmittance (%) | Haze (%) |
| --- | --- | --- | --- | --- |
| Sheet of Example 1 | 7,900 | 7,600 | 89 | 20 |
| Sheet of Comparative Example 1 | 6,200 | 6,300 | 90 | 34 |

Note:
*MD: Sheet extrusion direction
**TD: Direction perpendicular to the sheet extrusion direction

EXAMPLES 2 TO 5

In a flask which had been purged with argon gas were successively introduced 650 ml of dehydrated and purified n-heptane, 94 mmol of diethylaluminum chloride, and 27 g of a titanium trichloride catalyst produced by Marubeni Solvay Co., Ltd. The resulting mixture was heated to 60° C. and then 150 ml of vinylcyclohexane was added. The polymerization was carried out for 150 minutes. As a resault, a catalyst having 4.20 g of vinylcyclohexane polymerized, per gram of the titanium trichloride, was obtained.

Using 42.3 g of the vinylcyclohexane polymer-containing catalyst, 180 g of diethylaluminum chloride, and 150 l of n-heptane, propylene was polymerized in a 300-liter stainless steel autoclave under the conditions of pressure of 10 $kg/cm^2$ G, temperature of 60° C., and hydrogen concentration of 6.0 vol% for 5 hours. After the polymerization was completed, 30 l of n-butanol was added to stop the polymerization and to conduct deashing. Then the polymer powder was separated from the solvent by filtration.

The powder was dried and then weighed and found to be 29.5 kg. The amount of polymerized propylene was 3,620 g per gram of the titanium trichloride catalyst. [$\eta$] was 1.85 dl/g. The vinylcyclohexane content of the copolymer powder was 1,160 wt ppm as calculated from the amount of the polymer per the titanium trichloride catalyst.

The copolymer thus produced was mixed with homopolypropylene having a melt index of 2.0 in the proportion shown in Table 2, and the resulting mixture was pelletized by the use of a 65 mm $\phi$ granulator. At this time, 0.2 part by weight of BHT and 0.05 part by weight of calcium stearate as stabilizers and 0.05 part by weight of Irganox 1010 ® were added.

These pellets were melt extruded at a resin temperature of 280° C. by the use of a 65 mm $\phi$ sheet extruder, and cooled and solidified with a cooling roll maintained at 35° C. to obtain a 0.5 mm-thick sheet.

COMPARATIVE EXAMPLE 2

The homopolypropylene (melt index=2) used in Example 2 was pelletized by the same method as in Example 2 and then molded into a sheet.

COMPARATIVE EXAMPLE 3

To the homopolypropylene used in Comparative Example 2 were added, in addition to the additives used in Example 2, 0.1 PHR of a p-tert-butylbenzoic acid aluminum salt (PTBBA-Al). The resulting mixture was pelletized in the same manner as in Example 2 and then molded into a sheet.

COMPARATIVE EXAMPLE 4

In a flask which had been purged with argon gas were successively introduced 20 ml of dehydrated and purified n-heptane, 8.0 mmol of diethylaluminum chloride, and 1.17 g of a titanium trichloride catalyst produced by Marubeni Solvay Co., Ltd. The resulting mixture was heated to 60° C. and subsequently 3-methylbutene-1 gas was introduced in the gas portion for 5 hours to conduct the polymerization of 3-methylbutene-1. The amount of the polymer was 0.31 g per gram of the titanium trichloride catalyst.

Using the same catalyst as used above and diethylaluminum chloride, propylene was polymerized in the same manner as in Example 1 to obtain polypropylene containing 400 wt ppm of 3-methylbutene-1. A mixture of 97 parts by weight of homopolypropylene having a melt index of 2 and 3 parts by weight of the polypropylene as obtained above was, after addition of the same additives as used in Example 1, processed in the same manner as in Example 1 to obtain a sheet.

The physical properties of the sheets produced in Examples 2 to 5 and Comparative Examples 2 to 4 are shown in Table 2. The sheets of the present invention are superior to the comparative sheets in stiffness and transparency.

TABLE 2

| | Mixing Ratio | | Tensile Young's Modulus | | Transparency Internal |
| | Homo-polypropylene (%) | Co-polymer (%) | MD ($kg/cm^2$) | TD ($kg/cm^2$) | Haze (%) |
| --- | --- | --- | --- | --- | --- |
| Comparative Example 2 | 100 | — | 6,400 | 6,500 | 33 |
| Example 2 | 99 | 1 | 7,300 | 7,300 | 30 |
| Example 3 | 97 | 3 | 7,600 | 7,500 | 25 |
| Example 4 | 90 | 10 | 7,900 | 7,600 | 20 |
| Example 5 | 70 | 30 | 8,200 | 8,100 | 16 |
| Comparative Example 3 | 100 | — | 7,400 | 7,300 | 30 |
| Comparative Example 4 | 97 | 3 | 6,600 | 6,500 | 33 |

EXAMPLE 6

In a flask which had been purged with argon gas were successively placed 650 ml of dehydrated and purified n-heptane, 94 mmol of diethylaluminum chloride, and 27 g of a titanium trichloride catalyst (produced by Marubeni Solvay Co., Ltd.). The mixture was heated to 60° C. and then 40 ml of vinylcyclohexane was added and polymerized for 40 minutes. A catalyst in which 1.02 g of vinylcyclohexane per gram of the titanium trichloride catalyst was polymerized was obtained.

Using 45.7 g of the above vinylcyclohexane polymer-containing catalyst, 180 g of diethylaluminum chloride, and 150 l of n-heptane, propylene and ethylene were random polymerized in a 300-liter stainless steel autoclave under the conditions of ethylene concentration of 1.5 vol%, pressure of 4 kg/cm$^2$G, temperature of 50° C., and hydrogen concentration of 1.5 vol% for 5 hours. After the polymerization, 30 l of n-butanol was added to stop the polymerization and also to conduct deashing. Then the polymer powder was separated from the solvent by filtration.

The dry weight of the polymer powder was 54.7 kg. The amount of propylene polymerized was 2,350 g per gram of the titanium-containing solid catalyst. [η] was 2.12 dl/g. The vinylcyclohexane content of the copolymer powder as calculated from the weight of the polymer formed per the titanium trichloride catalyst was 434 wt ppm. This copolymer was pelletized by the use of a 65 mm φ granulator. In this process, 0.2 part by weight of BHT and 0.05 part by weight of calcium stearate as stabilizers and 0.05 part by weight of Irganox 1010 ® were added.

The pellets thus produced were melt extruded at a resin temperature of 280° C. by the use of a 65 mm φ sheet extruder and then cooled and solidified with a cooling roll to obtain a 0.5 mm-thick sheet. During the production of the sheet, roll staining and fuming were not observed. When the sheet was allowed to stand for 60 days under the conditions of temperature of 23° C. and relative humidity of 50%, bleeding was not observed.

COMPARATIVE EXAMPLE 5

To a propylene/ethylene random copolymer having a melt index of 2 and an ethylene content of 2 wt% were added the same additives as used in Example 6, and the resulting composition was molded into a sheet in the same manner as in Example 6.

The physical properties of the sheets produced in Example 6 and Comparative Example 5 are shown in Table 3.

TABLE 3

| | Tensile Young's Modulus | | Transparency |
|---|---|---|---|
| | MD (kg/cm$^2$) | TD (kg/cm$^2$) | Internal Haze (%) |
| Example 6 | 7,400 | 7,400 | 15 |
| Comparative Example 5 | 5,300 | 5,200 | 25 |

While the invention has been described in detail and with reference to specific embodiments thereof, it will be apparent to one skilled in the art that various changes and modifications can be made therein without departing from the spirit and scope thereof.

What is claimed is:

1. A crystalline polypropylene extrusion molded sheet obtained from a crystalline polypropylene composition containing a polymer of a vinylcycloalkane having at least 6 carbon atoms in an amount of 0.05 wt ppm to 1 wt% calculated as a vinylcycloalkane unit, wherein said composition is prepared by one of the following methods:
   (1) a vinylcycloalkane having at least 6 carbon atoms is polymerized in the presence of a Ziegler-Natta catalyst, and subsequently propylene is homopolymerized or copolymerized with other α-olefin; or
   (2) the polymer as obtained in (1) is mixed with a propylene homopolymer or a propylene/α-olefin copolymer; or
   (3) a polymer of a vinylcycloalkane having at least 6 carbon atoms as mixed with a propylene homopolymer or a propylene/α-olefin copolymer.

2. A crystalline polypropylene extrusion molded sheet as claimed in claim 1, wherein the amount of the polymer of the vinylcycloalkane is 0.5 to 5,000 wt ppm calculated as a vinylcycloalkane unit.

3. A crystalline polypropylene extrusion molded sheet as claimed in claim 1, wherein the vinylcycloalkane is selected from vinylcyclobutane, vinylcyclopentane, vinyl-3-methylcyclopentane, vinylcyclohexane, vinyl-2-methylcyclohexane, vinyl-3-methylcyclohexane, and vinylnorbornane.

4. A crystalline polypropylene extrusion molded sheet as claimed in claim 1, wherein the vinylcycloalkane is vinylcyclohexane or vinylnorbornane.

* * * * *